Oct. 18, 1955
S. D. DANIELSON
2,720,823
HOE ATTACHMENT FOR TRACTORS
Filed Oct. 19, 1954
2 Sheets-Sheet 1
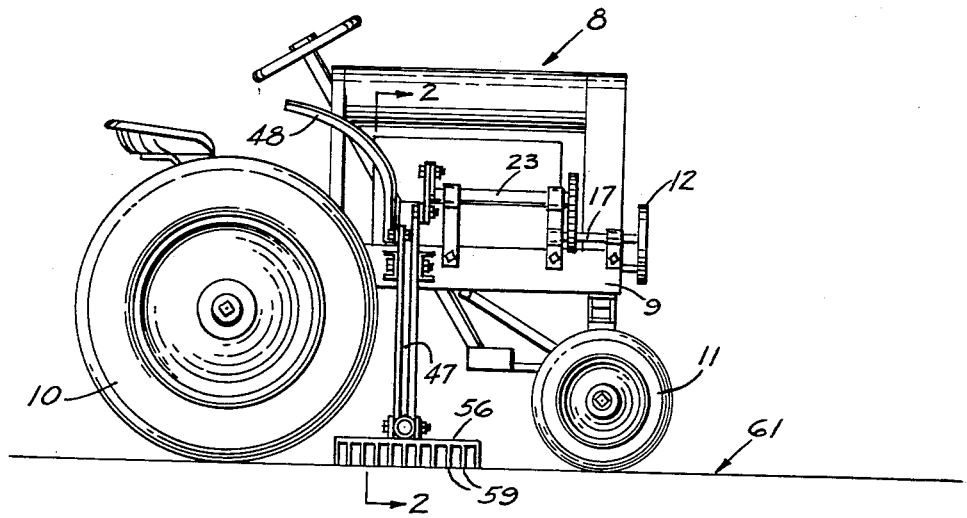
FIG. 1
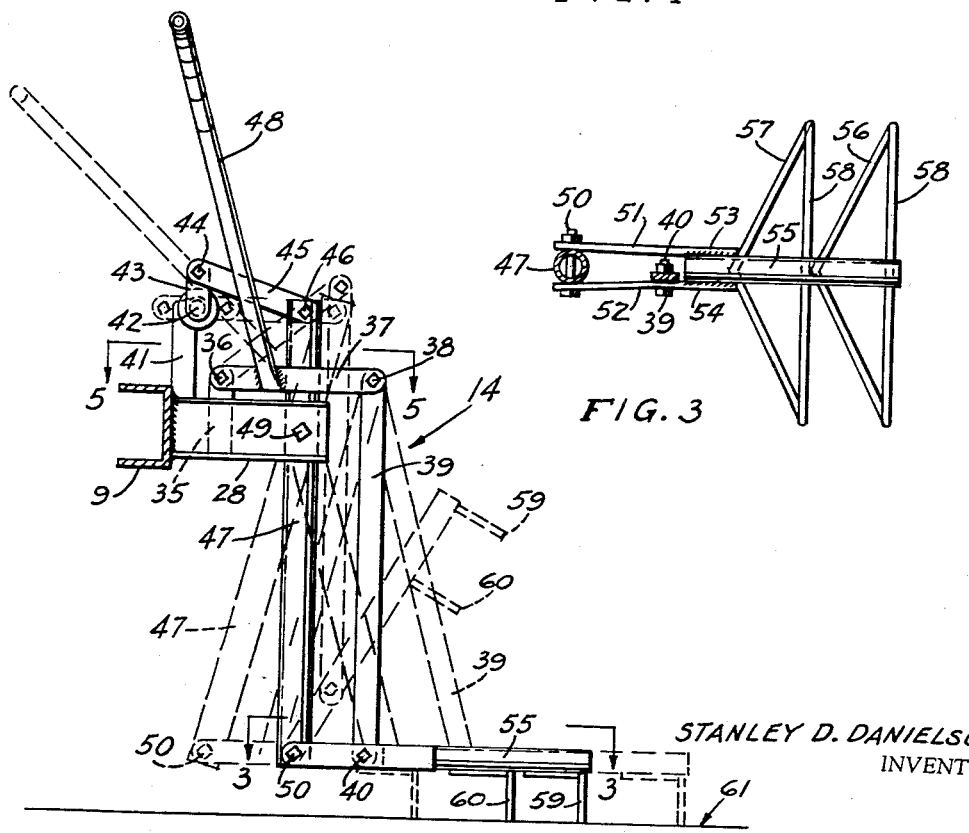
FIG. 2
FIG. 3
STANLEY D. DANIELSON
INVENTOR
BY
McMorrow, Berman & Davidson
ATTORNEYS Oct. 18, 1955 S. D. DANIELSON 2,720,823
HOE ATTACHMENT FOR TRACTORS
Filed Oct. 19, 1954 2 Sheets-Sheet 2

STANLEY D. DANIELSON
INVENTOR

BY
McMorrow, Berman & Davidson
ATTORNEYS

United States Patent Office 2,720,823
Patented Oct. 18, 1955

2,720,823

HOE ATTACHMENT FOR TRACTORS

Stanley D. Danielson, Puyallup, Wash.

Application October 19, 1954, Serial No. 463,199

2 Claims. (Cl. 97—36)

This invention relates to an improved power hoe attachment for tractors.

Among important objects of the invention are to provide a more practical, efficient, and simply constructed device of the character indicated above, which operates with less strain upon the tractor and its motor, and is more easily controlled by the driver of the tractor.

Another important object of the invention is to provide an improved device of the character indicated above which can be made in a rugged, serviceable, and attractive form at relatively low cost, and which is more easily installed upon and removed from a tractor.

Other important objects and advantageous features of the invention will be apparent from the following description and the accompanying drawings, wherein, for purposes of illustration only, a specific embodiment of the invention is set forth in detail.

Figure 1 is a right hand side elevation showing a tractor equipped with a hoe attachment in accordance with the present invention.

Figure 2 is a transverse vertical section taken on the line 2—2 of Figure 1 providing an enlarged rear elevation of the attachment, showing the same in depressed operative position in full lines, and in elevated inoperative position in phantom lines;

Figure 3 is a horizontal section taken on the line 3—3 of Figure 2;

Figure 4:
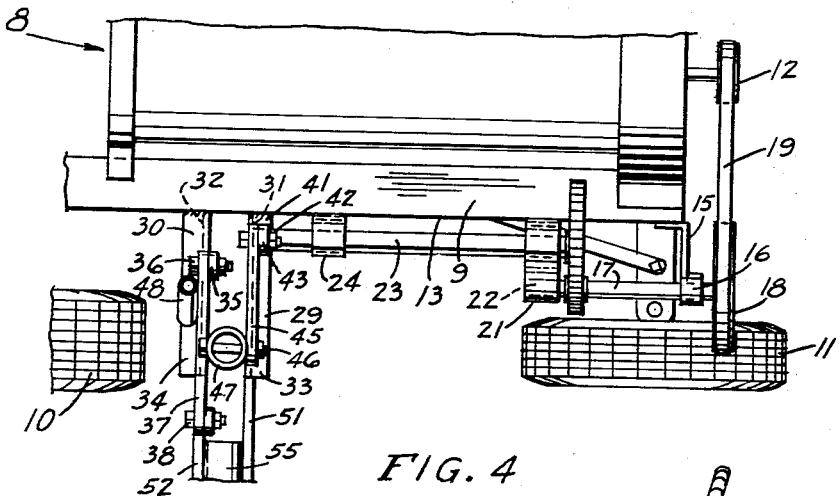
Figure 4 is a fragmentary and enlarged top plan view of Figure 1.
Figure 5:
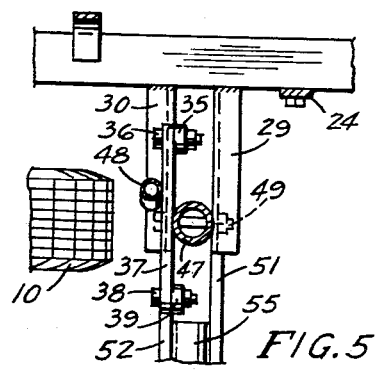
Figure 5 is a fragmentary horizontal section taken on line 5—5 of Figure 2.

Referring in detail to the drawings, wherein like numerals designate like parts throughout the several views, the numeral 8 generally designates a conventional form of farm tractor, having a right-hand horizontal frame side member 9, a rear drive wheel 10, a front steerable wheel 11, and a front power take-off pulley 12. Shown mounted on the tractor 8 is a hoe attachment, generally designated 14, in accordance with the present invention.

Figure 6:
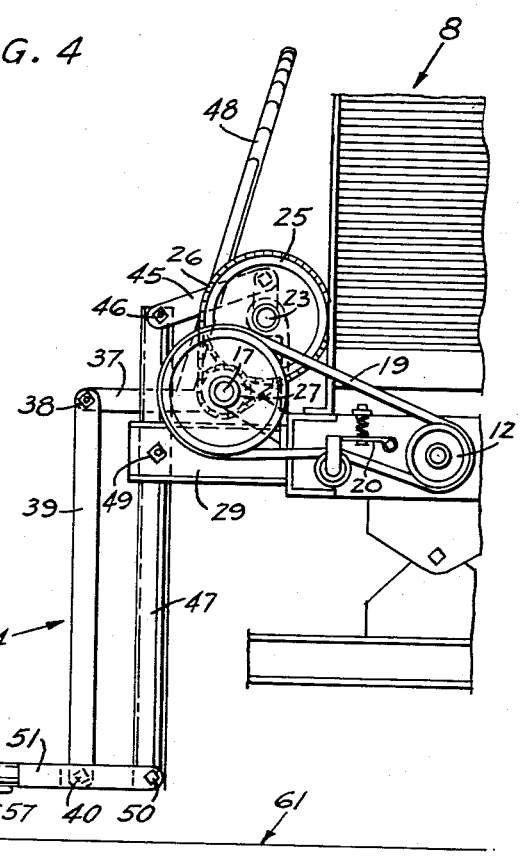
Figure 6 is an enlarged fragmentary front elevation of Figure 1.

The attachment 14 comprises a front bracket 15 which is secured in suitable manner to the outboard side 13 of the tractor frame side member 9 and projects laterally outwardly from and above the member 9 and terminates at its laterally outward end in a journal bearing 16 in which is journaled a forward end portion of a drive shaft 17. A belt pulley 18 on the forward end of the drive shaft 17 is coupled by a belt 19 to the tractor power take-off pulley 12, and, if desired, a belt-tightener arrangement, generally designated 20, may be mounted on the tractor 8 and engaged with the belt 19, as shown in Figure 6.

The rear end of the drive shaft 17 is journaled in the outer end of an intermediate bracket 21, as indicated at 22, the inner end of the bracket 21 being secured in suitable manner, to the outboard side 13 of the tractor frame side member 9, at a point spaced rearwardly from the front bracket 15.

A driven shaft 23, located laterally inwardly from the drive shaft 17, has its forward end journaled in the intermediate bracket 21, and has its rear end portion journaled through a rear bracket 24, the bracket 24 being secured, in suitable manner, to the outboard side 13 of the tractor frame side member 9.

Fixed on the forward end of the driven shaft 23, forwardly of the intermediate bracket 21 is a relatively large sprocket wheel 25 which is operatively connected by a sprocket chain 26 to a smaller sprocket wheel 27 fixed on the drive shaft 17, whereby the driven shaft 23 is operated from the tractor power take-off pulley 12.

A hoe bracket 28 is fixed, in suitable manner, to the outboard side 13 of the tractor frame side member 9, at a point spaced rearwardly from the rear bracket 24 and projects laterally outwardly. The bracket 28 preferably consists of two parallel spaced angle irons 29 and 30 having vertical flanges or webs 31 and 32, respectively, and horizontal flanges 33 and 34, respectively.

Fixed to and rising from the vertical flange 32 of the angle iron 30 is a standard 35 which is traversed by a pivot 36 at its upper end. Also engaged on the pivot 36 at the rearward side of the standard 35 is the laterally inward end of a generally horizontal lever 37, whose laterally outward end is engaged on a pivot 38. Also engaged in the pivot 38 at the forward side of the lever 37 is the upper end of a vertical link 39 traversed at its lower end by a pivot 40.

Another standard 41, fixed to and rising from the angle iron flange 33 laterally inwardly of the standard 35, is transversed at its upper end by a portion 42 of the driven shaft 23 to which is fixed the lower end of a short vertical lever 43, whose upper end is pivoted as indicated at 44 to the laterally inward end of a generally horizontal lever 45 which is traversed by a pivot 46 which also traverses an upper end portion of a vertical tubular arm 47.

Fixed to the rearward side of the lever 37 and rising therefrom and extending in a laterally inward direction, and curved rearwardly, as shown in Figure 1, to a point within reach of a driver seated on the tractor 8, is a tubular hoe elevating and depressing handle 48.

A pivot pin 49 traverses the vertical flanges 31 and 32 of the hoe bracket angle irons 29 and 30 and the tubular arm 47 at a point spaced below the upper end of the arm 47, and the lower end of the tubular arm 47 is traversed by a pivot 50.

A pair of parallel spaced side bars 51 and 52 have laterally inward ends engaged with the front and rear sides of the lower end of the tubular arm 47 and are pivoted thereto by the pivot 50.

The vertical link 39 has its lower end connected by the pivot 40 to the rear side bar 52 at a point laterally outwardly from the pivot 50, at the forward side of the side bar 52, as shown in Figure 3.

The laterally outward ends of the side bars 51 and 52, are fixed, as indicated at 53 and 54, to the front and rear sides, respectively, of a normally horizontal tubular arm 55, along whose underside are secured, in suitable manner, outer and inner triangular hoe frames 56 and 57, each having a longitudinal member 58 from which depend vertical and longitudinally spaced hoe elements 59 and 60, respectively.

The handle 48, when moved by the tractor driver to a laterally inward position, shown in phantom lines in Figure 3, swings the hoe elements upwardly and laterally inwardly and out of contact with the ground 61, as also shown in phantom lines in Figure 2; and movement of the handle 48 in the opposite direction, puts the hoe elements into a horizontal, ground-engaging position, as shown in full lines in Figure 2.

A hoeing operation is performed by operating the tractor power take-off pulley 12, through manipulation of conventional control means (not shown) on the tractor 8. This rotates the driven shaft 23 so that the lever 43, working through the lever 45 swings the tubular arm 47 inwardly and outwardly, thereby reciprocating the hoe elements 59 and 60 crosswise of the ground 61 at the side of the tractor 8.

What is claimed is:

1. In combination with a tractor having a longitudinal frame side member spaced above the ground and a front having a longitudinal axis power take-off, front, intermediate, and rear brackets projecting laterally from said side member, a drive shaft journaled in said front and intermediate brackets and operatively connected to said power take-off, a driven shaft journaled in said intermediate and rear brackets, means operatively connecting said drive shaft and driven shaft together, said driven shaft having a rear end having a fixed lateral eccentric lever thereon, a hoe assembly including a hoe bracket fixed to said frame side member, said hoe bracket comprising spaced parallel horizontal elements projecting laterally outwardly from said frame sides member, a vertical arm positioned between said bracket elements, said vertical arm having an upper end located above said bracket elements and a lower end located below said bracket elements, said vertical arm being pivoted to said bracket elements to swing laterally toward and away from said tractor frame side member, a generally horizontal hoe assembly having a laterally inward end mounted on the lower end of said vertical arm, and lever means operatively connected to the upper end of said vertical arm and said eccentric lever on the driven shaft.

2. In combination with a tractor having a longitudinal frame side member spaced above the ground and a front having a longitudinal axis power take-off, front, intermediate, and rear brackets projecting laterally from said side member, a drive shaft journaled in said front and intermediate brackets and operatively connected to said power take-off, a driven shaft journaled in said intermediate and rear brackets, means operatively connecting said drive shaft and driven shaft together, said driven shaft having a rear end having a fixed lateral eccentric lever thereon, a hoe assembly including a hoe bracket fixed to said frame side member, said hoe bracket comprising spaced parallel horizontal elements projecting laterally outwardly from said frame side member, a vertical arm positioned between said bracket elements, said vertical arm having an upper end located above said bracket elements and a lower end located below said bracket elements, said vertical arm being pivoted to said bracket elements to swing laterally toward and away from said tractor frame side member, a generally horizontal hoe assembly having a laterally inward end mounted on the lower end of said vertical arm, and lever means operatively connected to the upper end of said vertical arm and said eccentric lever on the driven shaft, means mounting the hoe assembly on the lower end of the vertical arm comprising pivot means, a laterally extending lever pivoted at one end on said hoe bracket, a vertical link having an upper end pivoted to the other end of said laterally extending lever and a lower end pivoted to said hoe assembly at a point at one side of said mounting means, and a handle fixed to and projecting upwardly from said laterally extending lever for swinging said link upwardly and downwardly so as to swing said hoe assembly upwardly from horizontal ground-engaging position to an elevated position out of contact with the ground.

References Cited in the file of this patent

UNITED STATES PATENTS

| | | |
|---|---|---|
| 764,366 | Mercer | July 5, 1904 |
| 870,434 | Hudson | Nov. 5, 1907 |
| 1,258,340 | Jones | Mar. 5, 1918 |
| 1,895,665 | Johnson | Jan. 31, 1933 |